US010414231B2

(12) United States Patent
Lauer et al.

(10) Patent No.: US 10,414,231 B2
(45) Date of Patent: Sep. 17, 2019

(54) SUPPORT WITH AIR EQUALIZATION CONTAINER

(71) Applicant: Bayerische Motoren Werke Aktiengesellschaft, Munich (DE)

(72) Inventors: Ingo Lauer, Munich (DE); Gerhard Zeller, Grafing (DE); Marc Erdmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 15/394,861

(22) Filed: Dec. 30, 2016

(65) Prior Publication Data

US 2017/0106709 A1    Apr. 20, 2017

Related U.S. Application Data

(63) Continuation of application No. PCT/EP2015/064915, filed on Jul. 1, 2015.

(30) Foreign Application Priority Data

Jul. 2, 2014   (DE) .................. 10 2014 212 788

(51) Int. Cl.
  *B60G 11/28*   (2006.01)
  *B60G 11/30*   (2006.01)
  *F17C 13/08*   (2006.01)

(52) U.S. Cl.
  CPC .............. *B60G 11/28* (2013.01); *B60G 11/30* (2013.01); *B60G 2202/152* (2013.01);
  (Continued)

(58) Field of Classification Search
  CPC . B60G 11/28; B60G 11/113; B60G 2204/128; B60G 2204/126; B60G 2202/152; F17C 13/08
  See application file for complete search history.

(56) References Cited

U.S. PATENT DOCUMENTS 2,226,605 A    12/1940  Gayer et al.
4,673,171 A     6/1987  Buma
(Continued)

FOREIGN PATENT DOCUMENTS

CN   103121386 A    5/2013
DE   34 47 750 A1   7/1985
(Continued)

OTHER PUBLICATIONS

International Search Report (PCT/ISA/210) issued in PCT Application No. PCT/EP2015/064915 dated Sep. 22, 2015 with English translation (Six (6) pages).
(Continued)

*Primary Examiner* — Karen Beck
(74) *Attorney, Agent, or Firm* — Crowell & Moring LLP

(57) ABSTRACT

A support of a vehicle, in particular of a motor vehicle, is provided with a recess for accommodating a container that is embodied as an air equalization container. The container has connecting points, which are located in a first plane of the container and are designed to connect to the support. The container is designed as a supporting component, and further includes other connecting points in a second plane that is spaced apart from the first plane, the other connecting points being formed for the connection to the support of the vehicle.

12 Claims, 3 Drawing Sheets

(52) U.S. Cl.
CPC .. *B60G 2204/126* (2013.01); *B60G 2204/128* (2013.01); *F17C 13/08* (2013.01)

(56) References Cited

U.S. PATENT DOCUMENTS

| | | | | |
|---|---|---|---|---|
| 4,697,796 | A | * | 10/1987 | Kitamura ............... B60G 11/30 267/195 |
| 5,040,775 | A | * | 8/1991 | Miyakawa ........... B60G 13/003 267/140.13 |
| 2003/0127781 | A1 | | 7/2003 | Fritz |
| 2004/0150209 | A1 | | 8/2004 | Valdez et al. |
| 2005/0062251 | A1 | | 3/2005 | Ramsey |
| 2006/0118373 | A1 | | 6/2006 | Birkwald et al. |
| 2010/0327573 | A1 | | 12/2010 | Burns |
| 2013/0099459 | A1 | | 4/2013 | Remboski et al. |
| 2013/0119630 | A1 | | 5/2013 | Hulbert et al. |
| 2015/0217620 | A1 | * | 8/2015 | Berg ................. B60G 17/0432 280/6.157 |
| 2017/0106709 | A1 | * | 4/2017 | Lauer ..................... B60G 11/28 |
| 2017/0120712 | A1 | * | 5/2017 | Coombs ............... B60G 17/052 |
| 2018/0015800 | A1 | * | 1/2018 | Derr ....................... B60G 11/28 |

FOREIGN PATENT DOCUMENTS

| | | |
|---|---|---|
| DE | 195 08 854 A1 | 2/1996 |
| DE | 102 00 632 A1 | 7/2003 |
| DE | 10 2004 030 469 A1 | 1/2006 |
| DE | 10 2008 054 114 A1 | 5/2010 |
| DE | 10 2011 118 324 A1 | 5/2013 |
| EP | 1 435 319 A2 | 7/2004 |
| WO | WO 2004/012979 A1 | 2/2004 |

OTHER PUBLICATIONS

German-language Written Opinion (PCT/ISA/237) issued in PCT Application No. PCT/EP2015/064915 dated Sep. 22, 2015 (Six (6) pages).

German-language Search Report issued in counterpart German Application No. 10 2014 212 788.2 dated Mar. 9, 2015 with partial English translation (Thirteen (13) pages).

Chinese-language Office Action issued in counterpart Chinese Application No. 201580034834.7 dated Jul. 30, 2018 with English translation (nine (9) pages).

\* cited by examiner

Line A - A

SUPPORT WITH AIR EQUALIZATION CONTAINER

CROSS REFERENCE TO RELATED APPLICATIONS

This application is a continuation of PCT International Application No. PCT/EP2015/064915, filed Jul. 1, 2015, which claims priority under 35 U.S.C. § 119 from German Patent Application No. 10 2014 212 788.2, filed Jul. 2, 2014, the entire disclosures of which are herein expressly incorporated by reference.

BACKGROUND AND SUMMARY OF THE INVENTION

Vehicles, particularly motor vehicles, usually have an axle system. If the axle system is equipped with an air suspension, a container (tank) is required, which is used as an air balancing (equalization) storage volume.

However, such a container needs installation space that is also required for bearing structures of the vehicle body. Up to now, the container had been screwed to a structure or bearing structure such that the forces from the wheel suspension into the vehicle body could be supported.

The bearing structures, which are absent because of the existing container, have a negative effect on the stiffness and strength functions of the vehicle. Corresponding compensation measures therefore have to be taken at a different point which, however, result in increased expenditures and/or increased weight.

It is an object of the invention to provide a support and a container designed as an air balancing storage volume, which are improved such that the expenditures for the compensation measures are reduced.

This and other objects are achieved by a support of a vehicle, wherein the support has a recess for receiving a container constructed as an air balancing storage volume of the vehicle. The container is equipped with connection points, which are situated in a first plane of the container and are constructed for the connection to the support. The container is constructed as a bearing component, and, in a second plane spaced away from the first plane, has additional connection points, which are constructed for the connection to the support of the vehicle. At its connection points provided in the first plane of the container and at its further connection points provided in the second plane, the container is linked to the support, so that the container bridges the recess in the support and thereby forms a bearing flange. A method is further disclosed for producing a container for a support according to the invention.

By means of the support according to the invention, an integration of the container as a supporting part for the vehicle rigidity can be achieved by additional connection points or fastening points in a second plane.

This results in savings with respect to weight and cost, in a reduction of the required installation space and in an enlargement of the trunk volume of a motor vehicle.

Other objects, advantages and novel features of the present invention will become apparent from the following detailed description of one or more preferred embodiments when considered in conjunction with the accompanying drawings.

Terms, such as "front", "rear", "top", "bottom" are to be understood with respect to a conventional motor vehicle, which is situated on a level road and whose normal travel direction is toward the front.

DETAILED DESCRIPTION OF THE DRAWINGS

Figure 1:
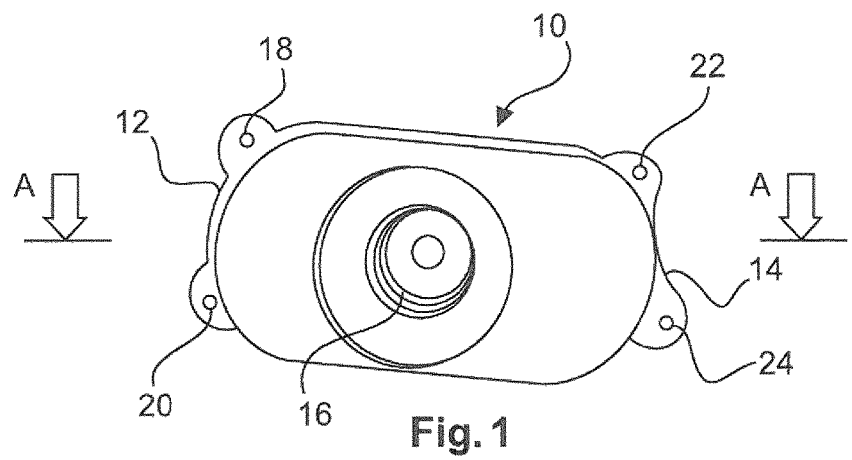
FIG. 1 is a bottom view of a container, which is designed as an air balancing volume according to an embodiment of the invention.

FIG. 1 is a bottom view of a container 10 according to the invention. The container 10 essentially has the shape of an oblong box, as explained in greater detail in the following with respect to FIG. 7.

The container 10 has a forward lug 12 and a rearward lug 14. A spring strut receiving device 16 for receiving a spring strut of an air suspension is provided in the center on the underside.

The forward lug 12 has holes 18, 20, which are used as additional connection points. The rearward lug 14 correspondingly has holes 22, 24, which are also used as additional connection points.

Figure 2:
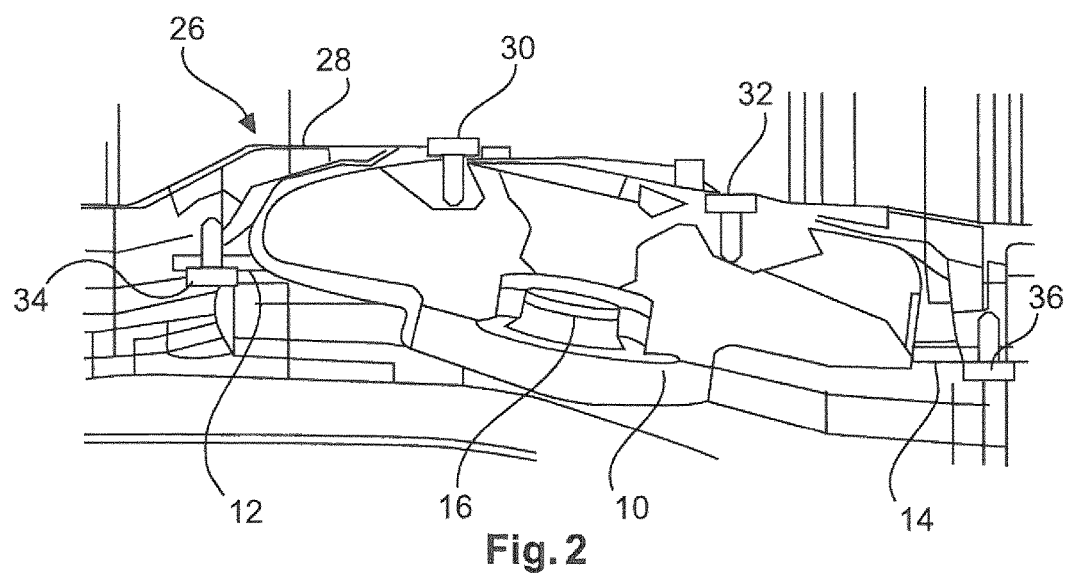
FIG. 2 is a longitudinal sectional view along Line A-A of FIG. 1.

FIG. 2 is a longitudinal sectional view of a support 26 of a motor vehicle designed as a side member, which support 26 has a cavity in which the container 10 is installed.

Until now, a conventional container had been fastened only by means of screws 30, 32 on its upper side to the side member 26.

According to the invention, the container 10 is linked to the support 26, which is constructed as a side member, by way of further connection points, of which two are illustrated in FIG. 2 as screws or threaded bolts 34, 36.

Figure 3:
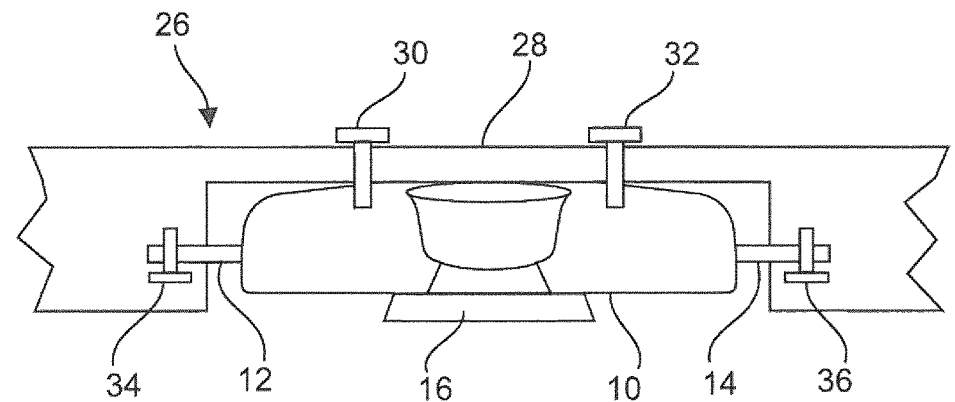
FIG. 3 is a schematically simplified sectional view corresponding to FIG. 2 for explaining how the container is screwed to a support of a motor vehicle constructed as a side member.

FIG. 3 is a schematically very simplified view of the supporting structure achieved according to the invention. In this case, the upper section of the cavity of the support 26 constructed as a side member forms an upper flange 28, and the container 10 linked to the side member forms a lower flange of the resulting supporting structure.

Figure 4:
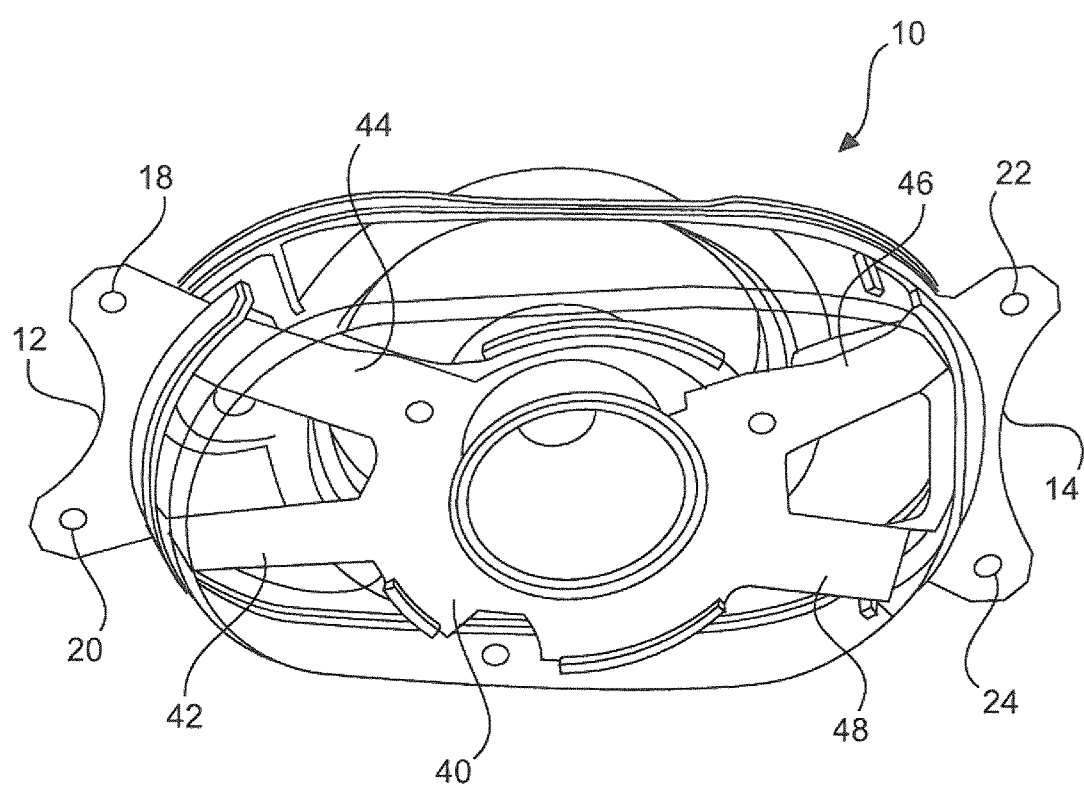
FIG. 4 is a perspective view of the container which has a reinforcing profile part with four legs.

FIG. 4 is a perspective view of a container 10 which, as described above, is equipped with a forward lug 12, which has two holes 18 and 20, and with a rearward lug 14, which has two holes 22, 24.

Furthermore, the container has a reinforcing profile part 40, which is equipped with four legs 42, 44, 46, 48 arranged approximately in the shape of an "X".

In this case, the two forward legs 42, 44 are connected with the forward lug 12 and the two rearward legs 46, 48 are connected with the rearward lug 14. By means of the reinforcing profile part 40, a considerably increased rigidity, particularly a bending stiffness, of the container 10, can be achieved at low expenditures. In addition, the introduction of force into the side member 26 is improved.

Figure 5:
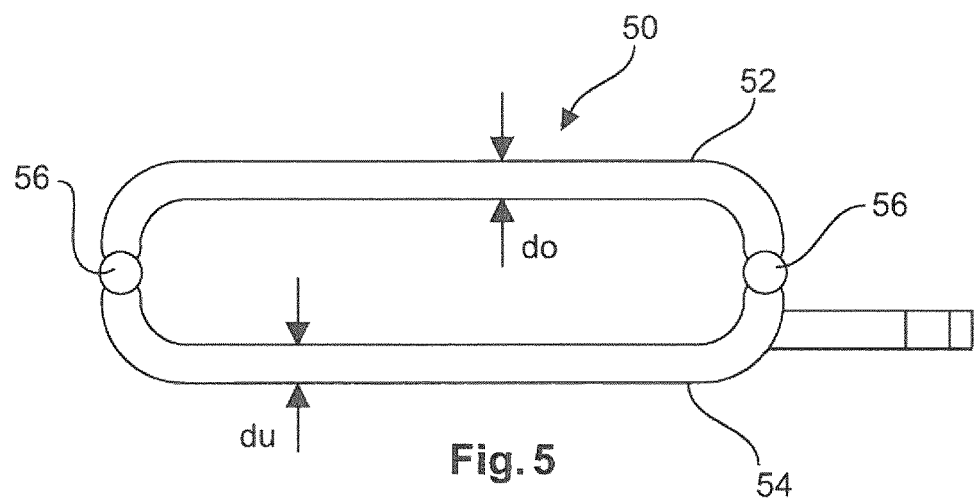
FIG. 5 is a longitudinal sectional view of a container with an upper and a lower half-shell.

FIG. 5 is a sectional view of a container 50 according to an embodiment of the invention, which has an upper half-shell 52 and a lower half-shell 54, which both consist of steel. Here, the thickness d of the upper half-shell 52 amounts to approximately 3 mm, to avoid warping, and the thickness d of the lower half-shell 54 amounts to approximately 2 to 2.5 mm.

The two half-shells 52, 54 of the container 50 are mutually connected by a circumferential weld seam 56. Such a container is designed for a working pressure of 20 bar and a bursting pressure of 30 bar.

Figure 6:
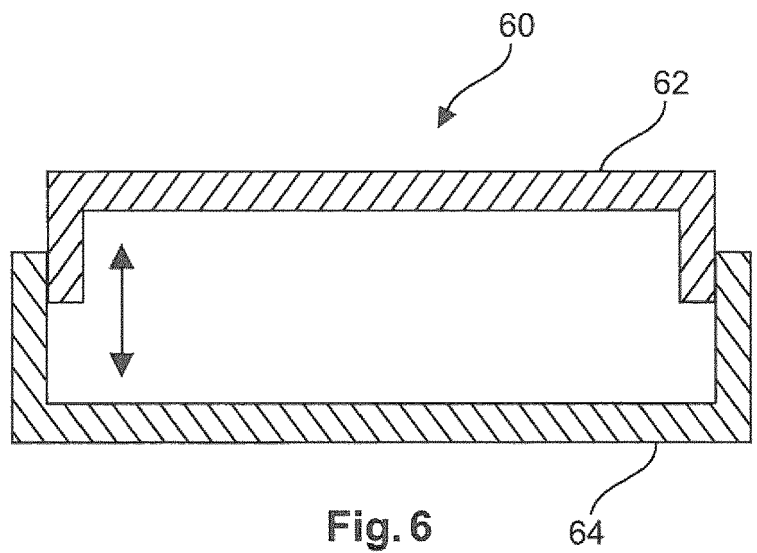
FIG. 6 is a longitudinal sectional view of a preliminary stage of a container having an upper and a lower half-shell, which can be telescopically displaced with respect to one another.

FIG. 6 illustrates an embodiment of a container 60 according to the invention, which also has an upper half-shell 62 and a lower half-shell 64. As in the embodiment illustrated in FIG. 5, these two half-shells also consist of steel. The two half-shells 62, 64 can be telescopically displaced with respect to one another in the direction of the arrow in FIG. 6.

During the production of the container 60, the approach is such that a desired air balancing volume in the interior of the container 60 is achieved by a telescopic mutual displacement of the upper half-shell 62 and the lower half-shell 64. The upper half-shell 62 will then be connected with the lower half-shell 64 for forming a pressure-tight container, specifically when the two half-shells 62, 64 are formed by a circumferential weld seam.

The forming of the container 60 by half-shells 62 and 64, which can be telescopically displaced with respect to one another, reduces the costs and facilitates the production and the storage, because, in each case, only a single type of upper half-shell 62 and a corresponding lower half-shell 64 have to be produced and stored, and nevertheless different air balancing volumes and therefore different finished containers 60 can be made available.

Figure 7:
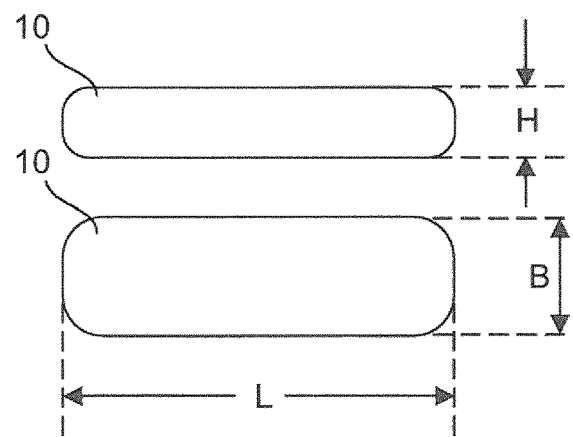
FIG. 7 shows very simplified sectional views of a container for clarifying its dimensions (length, width, height).

As illustrated in FIG. 7, the container 10 essentially has the shape of a flat box. In this case, the height H amounts to approximately 1.5 to 2 times the width B, and the length L amounts to approximately 5 to 7 times the height H.

LIST OF REFERENCE NUMBERS

10 Container (tank)
12 Lug (forward)
14 Lug (rearward)
16 Spring strut receiving device
18 Hole (of 12)
20 Hole (of 12)
22 Hole (of 14)
24 Hole (of 14)
26 Support
28 Upper flange
30 Screw (threaded bolt)
32 Screw (threaded bolt)
34 Screw (threaded bolt)
36 Screw (threaded bolt)
40 Reinforcing profile part
42 Leg (of 40)
44 Leg (of 40)
46 Leg (of 40)
48 Leg (of 40)
50 Container
52 Upper half-shell
54 Lower half-shell
56 Weld seam
60 Container
62 Upper half-shell
64 Lower half-shell The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A support of a vehicle, comprising:
   a recess arranged in the support;
   a self-contained pressure-tight container configured to be received in the recess, the container being formed as an air balancing storage volume, wherein
   the container comprises connection points arranged in a first plane of the container and being configured for connection to the support, the container being configured as a bearing component,
   the container comprises additional connection points arranged in a second plane spaced apart from the first plane, the additional connection points being configured for connection to the support, and
   at the connection points in the first plane and at the additional connection points in the second plane, the container is linked to the support so that the container bridges the recess in the support and forms a bearing flange.

2. The support according to claim 1, wherein the vehicle is a motor vehicle.

3. The support according to claim 1, wherein
   a first lug and a second lug are provided at the container,
   the first lug projects from a forward side of the container toward a front of the vehicle,
   the second lug projects from a rearward side of the container toward a rear of the vehicle,
   the first lug has two holes constructed as connection points,
   the second lug has two holes constructed as connection points, and
   the two holes of the first lug and the two holes of the second lug form four corners of a rectangle.

4. The support according to claim 1, wherein
   the container has a shape of a flat cuboid rounded at a forward end and at a rearward end,
   a width of the container is twice a height of the container, and
   a length of the container is three to four times the height.

5. The support according to claim 1, wherein
   a receptacle is equipped with a spring strut receiving device by which forces acting on an axle of the vehicle are introduced into the container.

6. The support according to claim 1, further comprising a reinforcing profile part configured to stiffen the container, wherein
   the profile part is provided in an interior of the container, and
   the profile part has four legs arranged in an X shape.

7. The support according to claim 1, wherein the container comprises an upper half-shell and a lower half-shell.

8. The support according to claim 7, wherein the upper half-shell and the lower half-shell are connected via a circumferential weld seam.

9. A method of producing a container for a support of a vehicle according to claim 1, the method comprising the acts of:
   providing an upper half-shell and a lower half-shell of the container;

configuring the upper half-shell and the lower half-shell to be telescopically displaceable with respect to one another in a direction of a height of the container;

mutually displacing the upper half-shell and the lower half-shell telescopically until a desired air balancing volume is achieved in an interior of the container; and connecting the upper half-shell with the lower half-shell to form a pressure-tight container.

10. The support according to claim 1, wherein the container is a tank that contains air therein.

11. A vehicle, comprising:

a support having a recess;

a self-contained pressure-tight container configured to be received in the recess, the container being formed as an air balancing storage volume, wherein the container comprises connection points arranged in a first plane of the container and being configured for connection to the support, the container being configured as a bearing component, the container comprising additional connection points arranged in a second plane spaced apart from the first plane, the additional connection points being configured for connection to the support, and at the connection points in the first plane and at the additional connection points in the second plane, the container is linked to the support so that the container bridges the recess in the support and forms a bearing flange.

12. The vehicle according to claim 11, wherein the container is a tank that contains air therein.

* * * * *